United States Patent
Rao et al.

(10) Patent No.: US 7,338,589 B2
(45) Date of Patent: Mar. 4, 2008

(54) PROCESS FOR RECOVERY OF GALLIUM

(75) Inventors: Patcha Ramachandra Rao, Jamshedpur (IN); Puvvada George Vijay Kumar, Jamshedpur (IN); Archana Agrawal, Jamshedpur (IN); Indranil Chattoraj, Jamshedpur (IN)

(73) Assignee: Council of Scientific and Industrial Research, New Delhi (IN)

( * ) Notice: Subject to any disclaimer, the term of this patent is extended or adjusted under 35 U.S.C. 154(b) by 487 days.

(21) Appl. No.: 10/393,297

(22) Filed: Mar. 20, 2003

(65) Prior Publication Data
US 2004/0042945 A1   Mar. 4, 2004

(30) Foreign Application Priority Data
Mar. 28, 2002   (WO) .................. PCT/IN02/00079

(51) Int. Cl.
*C25C 1/22*   (2006.01)
*B01D 11/00*   (2006.01)
(52) U.S. Cl. ..................... 205/564; 423/112
(58) Field of Classification Search ............... 423/112; 205/564
See application file for complete search history.

(56) References Cited

U.S. PATENT DOCUMENTS

| | | | | |
|---|---|---|---|---|
| 4,241,029 A | * | 12/1980 | Helgorsky et al. | 423/112 |
| 4,438,078 A | | 3/1984 | Nalewajek | 423/21.5 |
| 4,844,808 A | | 7/1989 | Sabot et al. | 210/634 |
| 5,204,074 A | | 4/1993 | Pescher et al. | 423/112 |

OTHER PUBLICATIONS

Product Data Sheet for VERSATIC 10, May 2002, pp. 1-3.*
Puvvada G V K; "Liquid-Liquid . . . Surfactants"; Hydrometallurgy, Elsevier Scientific Publishing CY. Amsterdam, NL.; vol. 52; No. 1; Apr. 1999; pp. 9-19; XP004163142.

* cited by examiner

*Primary Examiner*—Steven Bos
(74) *Attorney, Agent, or Firm*—Ladas and Parry LLP

(57) ABSTRACT

The present invention relates to a process for the recovery of gallium from Bayer process liquors. Bayer process liquor is obtained from alumina industries and contains 450 g/L $Na_2O$, 80 g/L $Al_2O_3$ and 190±20 ppm of gallium. The present invention utilizes an organic and inorganic phase for a two stage separation process to recover gallium with high purity.

6 Claims, No Drawings

PROCESS FOR RECOVERY OF GALLIUM

FIELD OF THE INVENTION

The present invention relates to a process for the recovery of gallium from Bayer process liquors. Bayer process liquor is obtained from alumina industries and contains 450 g/L $Na_2O$, 80 g/L $Al_2O_3$ and 190±20 ppm of gallium. This invention will be useful in recovering metallic gallium from alumina industries, where gallium is present in the Bayer process liquor.

BACKGROUND OF THE INVENTION

Gallium is relatively abundant in nature but is not naturally concentrated. It is usually associated with aluminium in bauxite, nephelines and other ores. It has been also found in the ashes of certain kinds of ore. A major resource for the recovery of gallium is gallium bearing aluminium ores. The spent caustic solution from Bayer process, which is recycled, builds up the gallium concentration approximately to 200 ppm. Gallium is also obtained from the iron mud or residues that results from the purification of zinc sulphate solutions, in zinc production.

Gallium is recovered from Bayer process liquors by the process of
1) direct electrolysis
2) solvent extraction and
3) ion exchange.

In the direct electrolysis process the gallium is generally recovered from Bayer process liquor by using mercury cathode. The drawbacks of this process are that when the organic content of the Bayer process liquor is high, the process becomes uneconomical due to low current efficiency and the use of the mercury is highly toxic to the environment. In such case preliminary separation of gallium with partial enrichment is carried out either by fractional precipitation (by neutralising the alkali with $CO_2$) or by removal of part of alumina by addition of lime and subsequent recovery of gallium by passing $CO_2$. Reference is made to Bhat and Sundarajan, J. Less Common Metals, 1967, 12 pp: 231-238 wherein they have studied the solvent extraction method for the recovery of gallium from the enriched fraction as mentioned above. In this study about 50% of the alumina content of the liquor was precipitated as calcium aluminate by the addition of lime. The gallia and the remaining part of alumina were then co-precipitated by neutralising the alkali with $CO_2$. This fraction containing about 0.6% $Ga_2O_3$ was dissolved in hydrochloric acid and maintaining free acid at 3N. From this solution gallium was extracted by contacting an equal volume of 20% TBP and then recovered by back extraction with water. Gallium was precipitated with ammonia and the gallium hydroxide dissolved in 10% sodium hydroxide, and from which gallium metal was finally obtained by electrolysis using a gallium cathode and nickel anode. The gallium thus obtained was found to be 99% pure with an overall recovery of 90%. The drawbacks are the destruction of the alumina liquor which cannot be recycled back into the Bayer process.

Reference is made to Varadhraj et al., J. Appl. Electrochemistry, 1989, 19(1) pp: 61-64, wherein their investigations on the effect of organics employing linear stripping voltammetry techniques on glassy carbon electrodes in alkaline gallate solutions revealed the inhibitory effect of those compounds on the electrodepositions of gallium and hence on gallium recovery from aluminate solutions.

Reference is made to Dorin and Frazer, J. Appl. Electrochemistry, 1988, 18(1), pp: 134-141, wherein they have electrodeposited gallium from a synthetic Bayer process liquor comprising 4.5M NaOH/0.2M $Na_2CO_3$/0.3M NaCl and 1.7M $Al(OH)_3$. The deposition was in part controlled by the mass transfer and in part by electron transfer step. Heavy metal impurities, such as Fe and V, usually found in these liquors, promote the hydrogen evolution reaction, completely inhibiting gallium production if present above certain critical concentrations, i.e. 3 ppm for Fe and 30 ppm for V. The drawbacks of the above mentioned two process are that the direct electrowinning of gallium from Bayer process liquor is not possible if the liquors contain iron and vanadium above their critical limits.

Reference is made to Leveque and Helegorsky, International Solvent Extraction Conference 1977, pp: 439-442, wherein the solvent extraction of gallium from concentrated Bayer process liquors using Kelex 100 was first reported. The organic phase was made up of 8.5 vol % of Kelex 100, 10 vol % of n-decanol and 81.5 vol % of kerosene. When this organic phase was contracted with a Bayer process liquor containing 75 g/L of $Al_2O_3$, 194 g/L of $Na_2O$ and 270 ppm of Ga, at 1.0:1.0 aqueous to organic phase ratio at 28° C., 80% of gallium was reported to be extracted in 3 h. The drawback of this process is the slow kinetics where the time taken to reach equilibrium was reported to be 3 h.

Reference is made to Pesic and Zhou. J. Metals, 1988, 40 pp: 24-26, wherein 80% of gallium extraction was obtained in 4 h from synthetic aluminate solutions containing 200 ppm of gallium. The drawback of this process is again slow kinetics. Reference may be made to Borgess and Mason wherein they have studied the solvent extraction of gallium from a weak Brazilian Bayer process liquor containing 110 ppm Ga, 16-25 g/L of $Al_2O_3$ and 108-120 g/L of $Na_2O$ using 10.0 vol % of Kelex 100, 5.0 vol % of Versatic 10, 8.0 vol % of n-decanol and 77 vol % of kerosene and showed 90% recovery in 2 min. Though the problem associated with the slow kinetics of gallium extraction is overcome by incorporating Versatic 10 acid into the organic phase the process is not addressed the actual recovery of the gallium metal.

Reference is made to Swift, J Am. Chem. Soc, 1924, 46, 2375-2381, wherein from 6.0M HCl gallium can be loaded selectively onto diethylether over virtually any probable co-existing elements excepting germanium and Fe(III). The presence of HCl promotes formation of $HGaCl_4$ which is extracted by solvation, but above 6.0M HCl competition with acid extraction reduces its recovery. Ether extraction was preceded by removal of heavy metal impurities and Fe(III) reduction through aluminum. The drawback of this process is its non selectivity to Fe (III), where aluminium is added to reduce Fe(III) to Fe(II).

Reference is made to Mihalov, I and Distin, P. A. Hydrometallurgy, 1992, 28, 13-27, wherein a detailed review on the solvent extraction of gallium from HCl solutions was given where several organic agents such as organophosphorous compounds, $D_2EHPA$, carboxylic acids, ketones, alkyl amines and quarterly ammonium salts are discussed with respect to their extractability of gallium from HCl solutions. Gallium is extracted as $GaCl_4$ into quarterly ammonium salts (eg., Tricapryl mono methyl ammonium chloride—Aliquat 336) by anion exchange. The extraction of gallium is rapid and increases with increasing chloride concentration.

U.S. Pat. No. 5,204,074 teaches the recovery of gallium from basic aqueous solutions thereof such as Bayer liquors by contacting with a medium comprising a gallium extractant. The gallium values are transferred to the extractant which is then contacted with a basic aqueous solution and the gallium then back-extracted into the basic aqueous solution. This solution is then further contacted with a second medium containing a gallium extractant to transfer the gallium values thereto. The gallium enriched second medium is then contacted with a second aqueous solution which can be either acidic or basic to back-extract the gallium values. This is then directly electrolyzed to produce gallium.

U.S. Pat. No. 5,008,016 discloses the recovery of gallium by liquid/liquid extraction from basic aqueous solutions using an organic phase containing a substituted hydroxyquinoline and caustic soda.

U.S. Pat. No. 4.169,130 discloses a the recovery of gallium by liquid/liquid extraction with a water immiscible organic phase comprising an organic solvent and a dissolved water insoluble substituted hydroxyquinoline. The recovery of gallium is conducted under inert atmosphere.

The above patents suffer from the disadvantages that the processes are kinetically slow, require inert atmosphere thereby not being feasible on large scale and low purity of gallium recovered.

OBJECTS OF THE INVENTION

The main object of the present invention is to provide a process for the recovery of gallium from Bayer process liquors which obviates the drawbacks as detailed above.

It is another object of the invention to provide a process for the recovery of gallium from Bayer process liquors which results in good yield and purity of gallium.

It is a further object of the invention to provide a process which results in economical and eco-friendly recovery of gallium from Bayer process liquors.

SUMMARY OF THE INVENTION

Accordingly the present invention provides a process for the recovery of the gallium from Bayer process liquors which comprises
i) contacting the Bayer process liquor with an organic phase comprising 10-15 vol % 7(4-ethyl-1-methyloctyl)-8-hydroxyquinoline, 10-15 vol % iso-decanol, 3-7 vol % VERSATIC 10 (neodecanoic acid) and 63-77 vol % kerosene at 1.0:1.0 aqueous to organic phase ratio at room temperature,
ii) separating the loaded organic and aqueous phases and scrubbing the said organic phase with 5.0-6.5 M HCl at 1.0:1.5 organic to aqueous phase ratio and stripping with 1.0-2.0M HCl solution at 1.0:1.0 organic to aqueous phase ratio and adding concentrated HCl to the said strip liquor to raise required acid concentration to 4M,
iii) adding 1.0-5.0 g/100 ml aliphatic carboxylic acid to the above stripped solution, and contacting the stripped solution obtained in step (ii) with an organic phase having a composition of 10-20 vol % tricaprylmethyl-ammonium chloride, 5-15 % iso-decanol and the balance kerosene at 1.0:0.25 aqueous to organic phase ratio at room temperature, for about 2 min followed by separation of organic phase,
iv) scrubbing the said organic phase with 5.0-6.5M HCl at 1.0:1.0 organic to aqueous phase ratio and stripping with 3.5-4.5M NaOH solution at 1.0:0.25 organic to aqueous phase ratio,
v) filtering the solution to remove iron hydroxide and electrowinning the strip solution using copper as cathode and stainless steel as anode in a voltage range from 1.80 to −2.2V to recover gallium.

In an embodiment of the invention the strip liquor of step (i) above has an element composition of:
Gallium=365.00-371.00 ppm
Aluminium=250.0-300.00 ppm
Vanadium=9.0-12.0 ppm
Iron=150.0-180.0 ppm
Manganese=1.8-2.5 ppm In another embodiment of the invention, the organic chemicals used such as (7-(4-ethyl-1-methyloctyl)-8-hydroxyquinoline, ascorbic acid, iso-decanol, VERSATIC 10, ALIQUAT 336 (tri capryl methyl-ammonium chloride) and kerosene are of commercial grade and inorganic chemicals such as HCl, NaOH are of analytical grade.

In another embodiment of the invention the aliphatic carboxylic acid is selected from the group consisting of tartaric acid, citric acid and ascorbic acid.

DETAILED DESCRIPTION OF THE INVENTION

The Bayer process liquor which gets recycled in the Bayer process after alumina precipitation and vanadium sludge precipitation gets enriched in gallium content normally to the extent of 200 ppm. This Bayer process liquor before being sent to bauxite leaching is subjected to stage-I solvent extraction using organic solvent mixture-1 at 1.0:1.0 aqueous to organic phase ratio for 10 min in order to extract gallium from the Bayer process liquor. After this step the organic and aqueous phases are separated and the Bayer process liquor is subjected to bauxite leaching. The gallium loaded organic phase whose composition is described above also contains alumina and soda to the extent of 1900 and 1950 ppm, respectively. These impurities are subjected to scrubbing using 5.0-6.5M HCl at 1.0:1.5 organic to aqueous phase ratio by mixing for 3 min. In this step the alumina and soda are removed into the scrub solution, whereas the loaded gallium remains in the organic phase with an average loss of 1% into the scrub solution. The scrubbed organic phase is then subjected to stripping step where 99% of the loaded organic phase is stripped using 1.0-2.0M HCl solution at 1.0:1.5 organic to aqueous phase ratio by mixing for 3 min. The gallium stripped organic phase is recycled for stage I solvent extraction. The gallium loaded strip HCl solution is brought to the desired HCl concentration by adding concentrated HCl solution and ascorbic acid is added at a rate of 1.0-5.0 g/100 ml of strip liquor.

Thus prepared strip liquor is subjected to stage II solvent extraction step. The stage II solvent extraction is conducted at an aqueous to organic phase ratio of 1.0:0.25 by mixing for 2 min. After this step the organic and aqueous phases are separated and the organic phase is subjected to scrubbing with 5.0-6.5M HCl at 1.0:1.0 organic to aqueous phase ratio by mixing for 2 min. After this step the organic and the aqueous phases are separated and the organic phase subjected to stripping with 3.0-5.0M NaOH solution at 1.0:1.0 organic to aqueous phase ratio by mixing for 3 min. All the gallium loaded into the organic phase II is stripped into the caustic solution. After the organic and aqueous phase separation the organic phase is recycled for further stage II extraction. The iron present in the strip liquor is precipitated as iron hydroxides and this precipitate is removed from the aqueous strip liquor by filtration. Thus obtained iron free gallium enriched strip liquor is subjected to electrolysis using copper cathode and steel anode at a potential of −1.95 to −2.05V. Finally gallium is deposited on the copper cathode and collected as a metal with >99% purity. After the deposition the caustic strip liquor is recycled for further stripping of gallium from the organic phase of stage II solvent extraction.

The uptake of gallium by KELEX 100 (7-(4-ethyl-1-methyloctyl)-8-hydroxyquinoline) proceeds through a cation exchange mechanism in which hydroxyl ions are liberated as shown below:

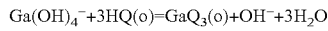

where HQ is KELEX 100 having chemical name (7-(4-ethyl-1-methylocty- 1)-8-hydroxyquinoline) and (o) indicates the organic phase.

The extraction of gallium from HCl solutions onto ALIQUAT 336 (chemical name tricaprylmethyl-ammonium chloride) is as per the following reaction:

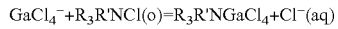

In the process present invention iron is suppressed from being extracted in IInd stage extraction using ALIQUAT 336. The suppression of iron was studied with the additions of aliphatic carboxylic acid such as tartaric, citric and ascorbic acids and out of these ascorbic acid was found to be successful in suppressing iron from being extracted.

Approximately 85% of iron can be arrested from being extracted into ALIQUAT 336 by adding desired amount of ascorbic acid to 50 ml of strip liquor. The remaining 15% iron got precipitated when the loaded ALIQUAT 336 was contacted with 4.0 M NaOH solution for the purpose of stripping and therefore 100% iron removal from the final strip liquor from which gallium is produced by electrowinning.

Novelty of the present invention is the use of the organic solvent containing KELEX 100, iso-decanol, VERSATIC 10 and kerosene in stage-I extraction which increases the kinetics of the extraction process and also use of aliphatic carboxylic acid such as ascorbic acid in the stage-II extraction reduces the iron impurity in the gallium.

The following examples are given by way of illustration of the present invention and therefore should not be construed to limit the scope of the present invention.

Solvent extraction (both stage I and stage II) experiments were conducted by preparing the organic phase of the required composition and mixing it thoroughly with the Bayer process liquor in a glass breaker using a mechanical stirrer at 1000±10 rpm. The glass beaker was immersed in water bath to maintain uniform temperature through out the experiment. All other inorganic chemicals used in this study were of analytical grade and standard laboratory glassware was used for all experimental purposes.

EXAMPLE-1

100 ml of Bayer process liquor was stirred with 100 ml of organic solvent-I containing 10% KELEX 100, 10% iso-decanol and 5% VERSATIC-10 and 75% of kerosene for 10 min. and then allowed to settle. The aqueous and organic phases were then separated using separating funnel and a sample was collected from the aqueous solution for gallium analysis. During this stage the organic phase extracts sodium, aluminium and other impurities along with the gallium. Therefore, scrubbing of the organic phase was conducted with 6.0 M HCl at 1.0:1.5 organic to aqueous phase ratio. During this stage gallium remains in the organic phase, which is then stripped with 1.5M HCl at 1.0:1.5 organic to aqueous phase ratio. The gallium concentration in the strip liquor was analysed and was found to be 340 ppm, giving 85% recovery into the strip liquor. This strip liquor containing 1.5M HCl was made up to 4.0M HCl by adding 14 ml of concentrated HCl to 100 ml of strip liquor along with 2.0 g/100 ml of ascorbic acid for iron suppression. After adding the HCl solution the concentration of gallium is reduced to 298.0 ppm. This was then subjected to solvent extraction stage II for further purification and concentration. The organic phase used in stage II was made up of 15 vol % of Aliquat 336, 10 vol % of iso-decanol and 75 vol % of kerosene. The aqueous to organic phase ratio was maintained at 1.0:0.25 and was mixed thoroughly with the stage I strip liquor for 2 min and then both the phases were separated using separating funnels. The loaded organic phase was scrubbed with 6.0M HCl at 1.0:1.0 organic to aqueous phase ratio and subjected to stripping with 4.0M NaOH solution at 1.0:0.25 organic to aqueous phase ratio. Gallium in the final strip liquor was found to be 4.75 g/L. 100 ml of this strip solution obtained from the second stage extraction was subjected to electrolysis at −1.8 v using EG&G potentiostat/galvanostat model No.273 and gallium was electrowon onto a copper cathode. Stainless steel anode and saturated calomel electrode as reference electrode were used in the electrowinning process. Metallic gallium of about 95% is obtained from the electrolysis of the strip liquor obtained from the IInd stage extraction.

EXAMPLE-2

100 ml of Bayer process liquor was stirred with 100 ml of organic solvent I containing 12% KELEX 100, 10% iso-decanol and 10% VERSATIC-10 and 68% of kerosene for 10 min. and then allowed to settle. The aqueous and organic phases were then separated using separating funnel and a sample was collected from the aqueous solution for gallium analysis. During this stage the organic phase extracts sodium, aluminium and other impurities along with the gallium. Therefore, scrubbing of the organic phase was conducted with 6.0 M HCl at 1.0:1.5 organic to aqueous phase ratio. During this stage gallium remains in the organic phase, which is then stripped with 1.5M HCl at 1.0:1.5 organic to aqueous phase ratio. The gallium concentration in the strip liquor was analysed and was found to be 345 ppm, giving 86% recovery into the strip liquor. This strip liquor containing 1.5M HCl was made up to 4.0M HCl by adding 14 ml of concentrated HCl to 100 ml of strip liquor along with 2.0 g/100 ml of ascorbic acid for iron suppression. After adding the HCl solution the concentration of gallium is reduced to 300 ppm. This was then subjected to solvent extraction stage II for further purification and concentration. The organic phase used in stage II was made up of 12 vol % of Aliquat 336, 10 vol % of iso-decanol and 78 vol % of kerosene. The aqueous to organic phase ratio was maintained at 1.0:0.25 and was mixed thoroughly with the stage I strip liquor for 2 min and then both the phases were separated using separating funnels. The loaded organic phase was scrubbed with 6.0M HCl at 1.0:1.0 organic to aqueous phase ratio and subjected to stripping with 4.0M NaOH solution at 1.0:0.25 organic to aqueous phase ratio. Gallium in the final strip liquor was found to be 4.5 g/L. 100 ml of this strip solution obtained from the second stage extraction was subjected to electrolysis at −2.2 v using EG&G potentiostat/galvanostat model No.273 and gallium was electrowon onto a copper cathode. Stainless steel anode and saturated calomel electrode as reference electrode were used in the electrowinning process. Metallic gallium of about 97% purity is obtained from the electrolysis of the strip liquor obtained from the IInd stage extraction.

EXAMPLE-3

100 ml of Bayer process liquor was stirred with 100 ml of organic solvent I containing 12% KELEX 100, 10% iso-decanol and 5% VERSATIC 10 and 73% of kerosene for 10 min. and then allowed to settle. The aqueous and organic phases were then separated using separating funnel and a sample was collected from the aqueous solution for gallium analysis. During this stage the organic phase extracts sodium, aluminium and other impurities along with the gallium. Therefore, scrubbing of the organic phase was conducted with 6.0 M HCl at 1.0:1.5 organic to aqueous phase ratio. During this stage gallium remains in the organic phase, which is then stripped with 1.5M HCl at 1.0:1.5 organic to aqueous phase ratio. The gallium concentration in the strip liquor was analysed and was found to be 380 ppm, giving 95% recovery into the strip liquor. This strip liquor containing 1.5M HCl was made up to 4.0M HCl by adding 14 ml of concentrated HCl to 100 ml of strip liquor along with 2.0 g/100 ml of ascorbic acid for iron suppression. After adding the HCl solution the concentration of gallium is reduced to 333 ppm. This was then subjected to solvent extraction stage II for further purification and concentration. The organic phase used in stage II was made up of 15 vol % of Aliquat 336, 10 vol % of iso-decanol and 75 vol % of kerosene. The aqueous to organic phase ratio was maintained at 1.0:0.25 and was mixed thoroughly with the stage I strip liquor for 2 min and then both the phases were separated using separating funnels. The loaded organic phase was scrubbed with 6.0M HCl at 1.0:1.0 organic to aqueous phase ratio and subjected to stripping with 4.0M NaOH solution at 1.0:0.25 organic to aqueous phase ratio. Gallium in the final strip liquor was found to be 5.32 g/L. 100 ml of this strip solution obtained from the second stage extraction was subjected to electrolysis using EG&G potentiostat/galvanostat model No.273 and gallium was electro-won onto a copper cathode. Stainless steel anode and saturated calomel electrode as reference electrode were used in the electrowinning process. Pure metallic gallium of more than 99% is obtained from the electrolysis of the strip liquor obtained from the IInd stage extraction. In a continuous electrowinning plant it is normal practice to maintain a buffer of 40 g/L of gallium to run the plant with reasonable current efficiency and therefore the low concentration of gallium which is 5.32 g/L obtained in the final strip liquor will not cause any current efficiency problems during electrowinning step.

The Main Advantages of the Present Invention Are
The organic phases used in this process can be recycled.
Metallic gallium obtained is of high purity
The process is environmentally friendly.

We claim:
1. A process for recovery of gallium from a Bayer process liquor which comprises the steps of
   (i) contacting the Bayer process liquor with an organic phase comprising 10-15 vol % 7-(4-ethyl-1-methyloctyl)-8-hydroxyquinoline, 10-15 vol % iso-decanol, 3-7 vol % neodecanoic acid and 63-77 vol % kerosene at an aqueous to organic phase ratio of 1.0:1.0 at room temperature to obtain a solution,
   (ii) separating the organic and aqueous phases of the solution obtained in step (i) and scrubbing said separated organic phase with 5.0-6.5 M HCl at a ratio of 1.0:1.5 organic to aqueous phase and then stripping the organic phase with 1.0-2.0M HCl solution at a ratio of 1.0:1.0 organic to aqueous phase and adding concentrated HCl to the scrubbed and stripped organic phase to raise the acid concentration to 4M of the scrubbed and stripped organic phase to prepare a scrubbed and stripped organic phase solution,
   (iii) adding 1.0-5.0 g/100 ml aliphatic carboxylic acid to the scrubbed and stripped organic phase solution prepared in step (ii), and contacting this solution with an organic phase having a composition of 10-20 vol % tricaprylmethyl-ammonium chloride, 5-15% iso-decanol and the balance kerosene at a ratio of aqueous to organic phase of 1.0:0.25 at room temperature, for about 2 minutes followed by separation of organic phase,
   (iv) scrubbing said separated organic phase prepared in step (iii) with 5.0-6.5M HCl at 1.0:1.0 organic to aqueous phase ratio and stripping with 3.5-4.5M NaOH solution at 1.0:0.25 organic to aqueous phase ratio to prepare solution, and
   (v) filtering the solution prepared in step (iv) to remove iron hydroxide and electrowinning the solution from which iron hydroxide has been removed using copper as cathode and stainless steel as anode in a voltage range from 1.80 to -2.2V to recover gallium.

2. The process as claimed in claim 1 wherein the strip liquor obtained in step (i) of claim 1 comprises:
   365.00-371.00 ppm of gallium,
   250.0-300.00 ppm of aluminum,
   9.0-12.0 ppm of vanadium,
   150.0-180.0 ppm of iron and
   1.8-2.5 ppm of manganese.

3. The process as claimed in claim 1 wherein 7-(4-ethyl-1-methyloctyl)-8-hydroxyquinoline, the aliphatic carboxylic acid, iso-decanol, neodecanoic, tricaprylmethyl ammonium chloride and kerosene are of commercial grade and HCl and NaOH are of analytical grade.

4. The process as claimed in claim 1 wherein the aliphatic carboxylic acid is selected from the group consisting of tartaric acid, citric acid and ascorbic acid.

5. The process as claimed in claim 1 wherein the iron suppression in the solution obtained in step (i) of claim 1 is 85%.

6. The process as claimed in claim 1 wherein in step (i) the Bayer process liquor is mixed with an organic phase consisting of 12 vol % 7-(4-ethyl-1-methyloctyl)-8-hydroxyquinoline, 10 vol % iso-decanol, 5 vol % neodecanoic acid and 73 vol % kerosene and stirred for 10 minutes.

* * * * *